April 5, 1966  J. D. RUSSELL  3,245,017
STRAIN GAGES AND MANUFACTURE OF SAME
Filed Nov. 21, 1961  2 Sheets-Sheet 1
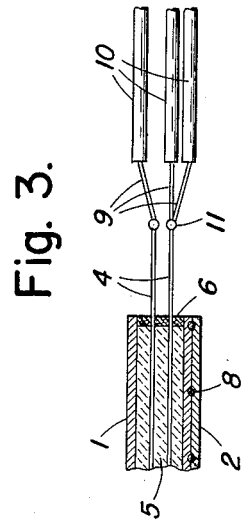
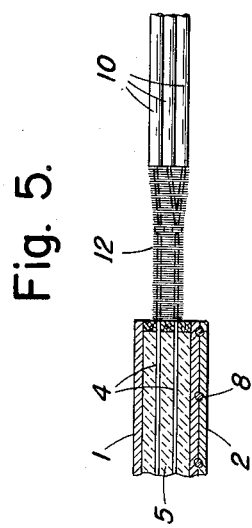
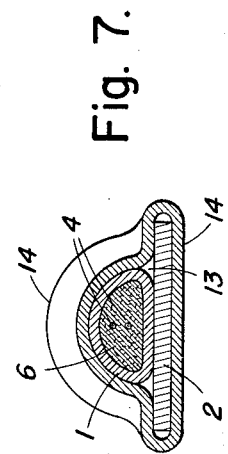
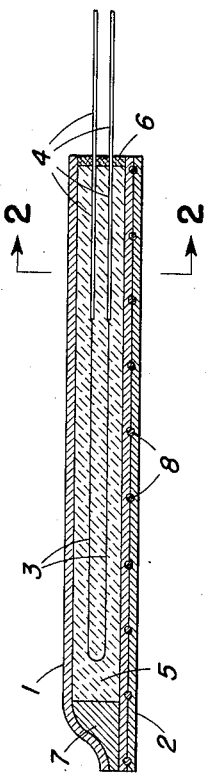
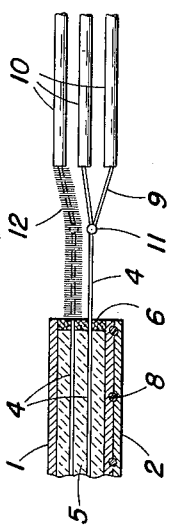
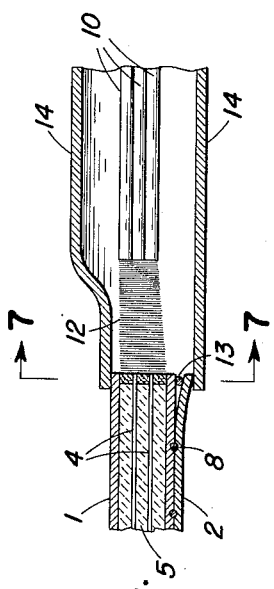
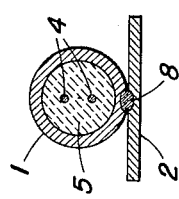
INVENTOR
John D. Russell
BY
*Charles J. Elderkin*
ATTORNEY April 5, 1966   J. D. RUSSELL   3,245,017
STRAIN GAGES AND MANUFACTURE OF SAME
Filed Nov. 21, 1961   2 Sheets-Sheet 2
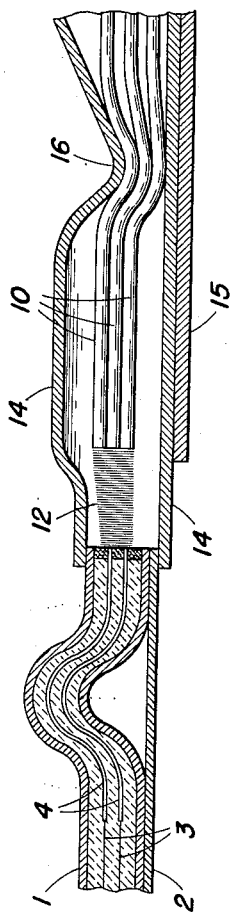
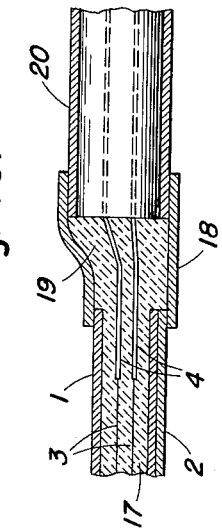
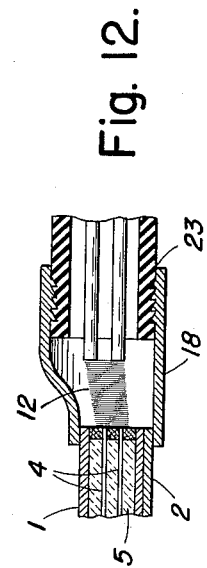
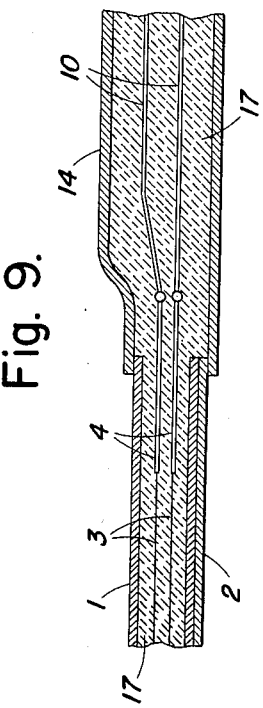
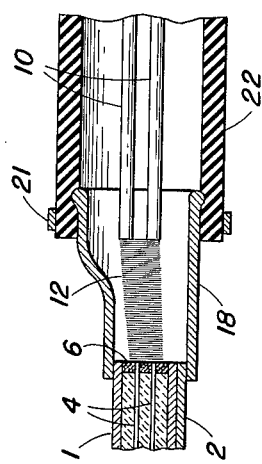
INVENTOR
John D. Russell
BY
Charles J. Elderkin
ATTORNEY

United States Patent Office 3,245,017
Patented Apr. 5, 1966

3,245,017
STRAIN GAGES AND MANUFACTURE OF SAME
John D. Russell, Malibu, Calif., assignor to Microdot Inc., South Pasadena, Calif., a corporation of California
Filed Nov. 21, 1961, Ser. No. 153,858
10 Claims. (Cl. 338—2)

This application is a continuation-in-part of U.S. application Ser. No. 754,956, filed August 14, 1958.

This invention relates to improvements in resistance wire strain gages for measuring strain in a body subjected to variable stress. More particularly, the invention contemplates the provision of improved strain gages of the resistance wire or filament type which are especially characterized by their extreme adaptability for work under adverse environmental conditions and relative ease of installation for use under such conditions. The invention further contemplates the provision of improved methods and procedures for the manufacture, and installation of resistance wire-type strain gages.

As engineers have become more accustomed to the use of resistance wire or filament type strain gages, they have attempted to employ these very delicate instruments under increasingly adverse conditions. Such conditions include both very high and very low temperatures, high wind velocities, and aqueous and corrosive media. Such a tendency is, of course, natural, in that the engineer desires to measure the strain resulting from stresses incurred under conditions of actual use of the body being tested. He thus desires to attach strain gages to models undergoing wind tunnel tests, to aircraft in actual use, to bodies subject to radiation phenomena such as reactors and missiles and the like, and to other structures such as surface ships, submarines, etc. for measurement of strain under actual operating conditions.

Needless to say, employment of conventional gages in such applications is fraught with danger, both with regard to feasibility of the tests at all and also with the accuracy of allegedly successful tests.

Among the more obvious problems arising in such tests are, of course, failure of the protective medium employed and the consequent failure of the gage upon direct exposure to the environmental conditions. Of course, if such a failure means only another wind-tunnel test, the cost may be reasonable, but if sea trials of a submarine are being made, it is an entirely different matter. The basic problem is that in all such methods, the effectiveness of the strain gage installation is never known until the conditions of operation are met; "trial and error" thus becomes the criterion.

When making strain gage tests under adverse conditions, engineers naturally try to avoid the above possibility of failure and to that end they take all precautions available when making the installation. As a result, installation procedures become both time consuming and expensive. For example, it was desired to measure strain on the propeller strut of the U.S.S. Saratoga, a Forrestal class aircraft carrier, during the sea trials of this vessel. Accordingly, while the ship was in drydock, a large area of the strut was ground down to provide a suitably smooth surface, the gages were applied, and the "Dean Shim Cap" method of waterproofing was employed. This involves covering the mounted gage with a soft wax, a layer of self-vulcanizing synthetic rubber, a stainless steel shim cap, and then another layer of self-vulcanizing synthetic rubber. Elaborate and unique cabling methods were devised and, needless to say, the cost was substantial.

Other problems which plague the engineers attempting to utilize strain gages under adverse conditions concern the fact that the installation may alter the properties of the gage. Resistance to ground, electrical and mechanical shielding, temperature compensation properties, and capacitance between leads may all be affected by installation. While changes in these properties may not cause failure of the installation, they can cause spurious results to be recorded which may have even more serious ramifications.

The present invention has for an object the elimination of the foregoing problems in the use of strain gages under adverse environmental conditions. More particularly, it is an object of my invention to provide a strain gage of the resistance wire or filament type which may be readily installed without concern for the medium in which it is to be used, which will not change its responsive characteristics by being so installed, and which will perform accurately under essentially any conditions of use.

Broadly, the invention described in my copending application provides improved strain gages which are attachable to the test specimen in such fashion that a strain-responsive coupling is attained over the entire effective length of the resistance filament contained within the gage, and without the use of cements or other sensitive bonding materials. In accordance with the various different structural embodiments of the invention, the strain gages are so constructed that they can be welded to the test specimen, either by application of normal arc welding techniques or sonic welding, to provide an instantaneous, rigid coupling between the test specimen and resistance filament along the entire length of the filament.

The gages described and claimed in my copending application may comprise a resistance wire or strain-responsive filament carried by a supporting element, such as an external housing, usually of metal, and mechanically locked to the supporting element by means of a dense mass of insulating material in such fashion that longitudinal changes in the dimension of the supporting element caused by deformation of a test specimen to which it is attached are imparted to the resistance wire or filament via the mass of insulating material. Thus, for example, the insulating material may be a compactible or compressible solid possessing both thermal and electrical insulating properties, which is deposited around the filament and enclosed within a metallic tube permanently deformed, as by drawing, crimping, etc., to exert a compressive force on the insulating material, thereby forcing it into firm compressive contact against the resistance element and effectively frictionally coupling the element to the external tube. Accordingly, with the tube attached along its entire length to a test specimen, strain applied to the tube from the test specimen is transmitted through the insulating material and hence to the resistance element contained therein. The resistance element is arranged for connection in a suitable electrical measuring network, such as a balanced bridge circuit, so that the changes in dimension of the test specimen caused by strain can be measured as a function of the correspondingly changed resistance of the filament. In still other embodiments of the invention, the gage may be assembled for ambient temperature measurement work by simply mounting the filament within a mass of insulating cement which is in turn mounted on a metallic flange adapted to be attached to a test specimen by welding, or, the strain-responsive filament may be coated directly with an oxide deposit with the combined unit then being firmly compressed within a suitable weldably-attachable housing, or the external housing may be formed integrally with the oxide-coated filament by electro-depositing a metallic coating around the same.

The essence of the present invention involves certain modifications of the construction procedure of the gages described above, whereby they are rendered completely impervious to penetration of moisture and/or other deleterious contaminants, coupled with the integral and leak-proof attachment to the gage of a tubular metal housing for the lead wires which can, of course, be as long as desired. The housing may be welded to the body being tested in a manner similar to the gage itself provided that measures are taken, described in detail hereinafter, to prevent stress changes in the lead wire housing from effecting the gage. The net result of the invention is a gage-lead wire installation which is positively protected against adverse environments whether they be moisture, steam, conducting fluids or gases. The gages can be accurately tested for leaks before installation, for example, with a helium leak detector, so that there is no chance of failure during service due to environmental factors. Leak rates as low as $1.5 \times 10^{-7}$ cc./sec. can be determined in this fashion. Of course, the welded mounting itself is a major factor in the ruggedness of the installed gage.

Installation of the gage is no more complicated than ordinary welded gage mounting as described in the aforesaid copending application; the gage is spot-welded to the surface being tested, and the housing is similarly welded for whatever length is necessary. No tedious surface preparation is necessary, and no special equipment, other than ordinary spot welding apparatus, is required. Indeed, only 1/10 to 1/3 of the time previously required is needed to install the gages of the present invention. Of considerable importance is the fact that the improved gages, as manufactured, are ready to install and no delicate connections have to be made to lead wires in the field. A possible source of trouble is thus entirely eliminated. Furthermore, a high resistance to ground is assured because the gage is in no way effected by installation. Also, as the sensitivity of the gage can be measured before it is mounted but with the lead wires in place, possible effects of temperature on lead wires, joints or leakage to ground can all be compensated for accurately with resultant more exact operation of the gage.

The preferred embodiment of my invention involves the use of a gage having the resistance wire or filament looped or bent into a U-shape within the gage so that the lead wires both extend out of one end of the gage. While it is not to be implied that my invention is limited to this type of gage construction, it has been found that such a gage, utilizing only one tubular housing for both lead wires, is considerably simpler and more economical to construct and use than a "straight wire" type of gage which would require two such housings.

Briefly, the construction of a strain gage according to my present invention involves two significant variations from construction techniques described in the aforesaid copending application. In my copending application, the suitably prepared strain-sensitive filament or filaments are loaded into a tube which is crimped at the tip end (the end away from the leads) a drop of solder is put over the tip, and the compressible or compactible powder is forced in around the filament. After the leads have been sealed in at the lead end, the assembly is spot-welded to a flange. During installation, this flange is spot-welded to the body being tested. In constructing the leak-proof gages of the present invention, I prefer to insert a silver-tinned plug into the tip end of the gage, crimp it, and during final assembly, heat the entire tip so as to provide an effective-leakproof tip for the gage. Also, when welding the supporting flange to the gage assembly, I prefer to leave a small length at the lead end unsoldered, the reason therefore being assistance in attaching the tubular lead-wire housing as described hereinbelow.

Construction of leak-proof strain gages in accordance with the present invention requires several additional steps. The first is attachment of lead-out wires to the lead wires extending from the gage. A detailed description of the procedures which are preferred at this stage is given hereinbelow. It is to be noted that utilization of the lead wires as an integral part of the gage gives rise to the term "integral-lead strain gage" which I apply to the present invention. After the lead-out wires are firmly attached, the tubular stainless steel housing is slid over the lead-out wires and up to the gage, a drop of silver solder is placed between the gage housing and the supporting flange (in the space left unwelded), and the stainless steel tube is placed around the entire lead end of the gage and suitably crimped. A small torch and a brazing alloy are then utilized to seal the gage assembly to the tubular housing.

In the foregoing manner, a completely leak-proof, integral lead strain gage may be constructed which will eliminate the need for any and all elaborate preparations for installation of strain gages for use in adverse environments of the types previously described.

It is believed that a more complete understanding of the present invention, as well as the advantages to be gained by the utilization thereof, will be had by referring to the detailed description of several specific embodiments thereof below, taken in conjunction with the several drawings, and in which:

FIGURES 1 and 2 are side and end sectional views, respectively, of a resistance wire strain gage especially constructed for use as a leak-proof integral lead strain gage;

FIGURES 3 through 7 are sectional views showing the individual steps in the construction of one embodiment of the leak-proof integral lead strain gage; and FIGURES 8 through 12 are sectional views illustrating different embodiments of the leak-proof integral lead strain gage designed for particular applications.

Referring to FIGURES 1 and 2, it will be seen that a representative gage adapted for use in the present invention comprises a tubluar shell 1 which may advantageously be made of stainless steel, and a supporting flange 2 which can also be made of stainless steel. When it is intended that the gage ultimately be used on aluminum structures, however, the flange 2 should be made from a gold-nickel alloy such as "Brazaloy" (trademark) or another alloy which may readily be welded to aluminum. The strain-sensitive resistance element or filament 3 is looped within the tubular housing 1 and is connected to the larger-diameter lead wires 4. In practice, the filament 3 and lead wires 4 are often made by electrolytically or chemically etching the center portion of a single piece of wire. It is important to note that in the construction of leak-proof integral lead strain gages it is often necessary to have the filament 3 and lead wires 4 extending further into the gage than would normally be necessary, for reasons which will be detailed in the description of FIGURE 8. The first step in the manufacture of a leak-proof gage such as is illustrated in FIGURES 1 and 2 is normally to take a stainless steel plug which has been tinned with a silver solder and insert it into the tip end of the tublar housing 1, and then crimp both the housing and the plug, thus closing off the tip end of the gage, as shown at 7. The filament 3 and lead wires 4 are then inserted and a compressible, insulating powder 5 is packed around them by, for example, centrifuging. The supporting flange 2 is spot welded 8 to the tubular housing 1, but it is important to note that this spot welding does not extend all the way to the lead end of the gage. It has been found that a convenient method of welding the housing to the support is the "Rollectrode" (trademark) method described in U.S. Patent Number 2,945,939. The basic gage structure is completed with the addition of a suitable sealer 6 to the lead end of the gage and crimping the tubular housing against the flange to compress the powder. The exact nature of the insulating powder 5 and the sealer 6 depend on the temperature range at which the gage is to be employed and a complete discussion of these materials appears in the aforementioned copending patent application.

It should be emphasized that FIGURES 1 and 2 represent only one embodiment of a gage adapted for use in the present invention and that other gage designs, and other configurations of filaments are also encompassed within the scope of my invention. Some of the possible alternative embodiments are described in detail hereinbelow.

Actual construction of a leak-proof integral lead strain gage is detailed in FIGURES 3 through 7. As shown in FIGURE 3, the lead end of the gage is at left; lead-out (low resistance) wires 9 having their insulation 10 stripped away are attached to the lead wires of the gage 4 with a silver solder 11 or by other suitable joining means. A combination flux silver solder alloy (Fusion Engineering "1400") was found satisfactory. As shown, three lead-outs are desired so two are joined to one of the lead wires. The next step involved in this type of leak-proof gage, pictured in FIGURE 4, is the winding of silicone varnish impregnated glass thread insulation 12 around one of the exposed joined wires; this must cover the entire distance from the lead-out wire insulation 10 to the gage sealer 6. Following this step, additional glass thread 12 is wound around all of the leads, including those previously covered, as shown in FIGURE 5. At this point it is advisable to fire the glass thread insulation so as to drive out any contained gases, combustibles or moisture. This also insures a high resistance to ground. Where the required integral lead is short it is possible to use one wire for all purposes, filament (3), lead (4), and lead out (9), and avoid any joining.

In the final stage of construction, FIGURES 6 and 7, the unwelded portion of the supporting flange 2 is bent slightly downwards and a drop of silver solder 13 is deposited therein. The lead-out wires are then inserted into a stainless steel lead-wire housing tube 14 which has been slightly flattened at the end so as to be able to slip over the entire strain gage assembly. For particular applications, a housing made of lead or another material may be preferred. The lead-wire housing 14 is then crimped around the end of the gage assembly and brazed or soldered thereunto. The applied heat will also have the effect of melting the drop of solder previously inserted between the gage tube 1 and the flange 2, so that the combined effect of the brazing will be a firm bond both internally, as shown at 13 in FIGURE 7, and externally. At the same time this operation is performed, heat is also applied to the tip end of the gage (see FIGURE 1), thus melting the solder which was applied to the stainless steel plug 7 before insertion; this provides a completely leak-proof seal at the tip end of the gage. It was found that this method of sealing the tip end was substantially superior to merely crimping the gage housing 1 and then applying a drop of solder over the exposed, flattened end of the tube, as it was found that the latter had a tendency to flake off when the unit was exposed to thermal shock. Also, the plug reduces shear lag by transferring more strain to the top of the tubular housing.

In use, it is very often desirable to weld the stainless steel lead-wire housing 14 to the body being tested as well as the gage itself. For applications of this sort, a somewhat modified leak-proof integral lead strain gage is necessary, and such a modified gage is illustrated in FIGURE 8. Firstly, a supporting flange 15 is attached to the lead-wire housing 14 to simplify attachment of the housing to the test structure. This may be like the flange support 2 of the gage itself, or can be a strap or any other suitable arrangement. Rigid attachment of the lead-wire housing to the test structure creates a potential source of inaccuracy in the gage, in that at least to a slight degree, the housing may vary the gage factor by transferring stress to the gage shell. This hazard can be eliminated, or at least reduced so as to be negligible, by putting the U-shaped bend shown in FIGURE 8 into the gage. While this is a relatively simple fabrication step, it is necessary that the bend be placed so that it occurs at that portion of the gage which contains the larger diameter lead wires, 4, rather than the filament 3, because if it is not, the end purpose of the bend will be defeated, and also the filament 3 may fracture if so deformed, thus ruining the gage. To this end, it is advisable to extend the lead wires 4 farther into the gage than would normally be the case, as mentioned above. Alternatively, the housing can be of a metal-bellows construction which is both flexible and does not transfer stress.

The crimp 16 in the lead-wire housing 14, as shown in FIGURE 8, serves to protect the gage and connection thereto from mechanical forces—i.e., pulling on the lead wires—which might tend to damage or break the gage, and is advisable in any case.

An alternative embodiment of the invention, one particularly adapted for use in high-temperature applications, is shown in FIGURE 9. In this embodiment, both the gage itself 1 and the lead-wire housing 14 are filled with a suitable ceramic powder having insulating characteristics. This eliminates the need for the sealer 6 and the glass thread insulation 12, previously described. While in any embodiment of the invention the lead-wire housing 14 can be as long as desired, in this embodiment a housing of too great length would of course not be practical.

A second alternative embodiment is illustrated in FIGURE 10. In this case the lead-wire housing 14 is replaced by a stainless steel adaptor 18 which is fitted onto the end of commercially available multi-conductor swaged wire 20. As the previously described method for joining the lead-wire to the gage (FIGURES 3–7) would in this case be inconvenient from a production standpoint, an alternative method is used. A crushable ceramic bead (not shown) which contains two holes is slipped over the lead wires which are then joined to the lead-out wires. The adapter sleeve 18 is then brought up tight and brazed to the gage. The pressure crushes the bead and provides an insulating powder as shown at 19. Alternatively, the joined wires could be spray-coated with an insulating medium.

Two additional embodiments of the invention are illustrated in FIGURES 11 and 12. In FIGURE 11, the previously described stainless lead-wire housing 14 is replaced by an adapter sleeve 18 to which is joined a flexible hose 22. This may be a waterproof hose, metal covered, or any of a variety of such hoses depending on the intended application. As will be noted from the figure, the adaptor sleeve is in this case provided with a suitable flange over which the hose is fitted, and the connection is sealed with a metal clamp 21. FIGURE 12 shows a somewhat similar installation, except that instead of having a hose through which the lead wires are threaded, a commercial multi-conductor cable having a waterproof rubber covering is utilized. The adaptor 18 in this case is provided with interior ridges so as to firmly retain the cable. Of course, alternative means for attachment could be employed. Both of the foregoing embodiments employ the same sort of joining technique as described in connection with FIGURES 3–7. It should be noted that these embodiments may be advantageously used for underwater tests, and that the hose or cable can be readily attached to the test structure by employing a thin metal strap and spot welding. There is no fear of impairing the accuracy of the gage by so doing.

Other embodiments of the invention, not illustrated, include the insertion of a T-joint on the stainless lead-wire housing for the purpose of maintaining gas at high pressure and/or a given temperature around the lead wires. Alternatively, gas can be pumped into the lead-wire housing to a specified pressure and the tube then sealed. In either embodiment it is necessary to seal the open end of the lead-wire housing with a suitable cement.

It is to be emphasized that in the foregoing detailed description, a single element gage has been shown for purposes of simplicity and convenience only; the invention may be used with multi-element gages, gages containing dummy coils for temperature compensation, combination strain elements and temperature sensing elements, gages containing complete four-element bridge networks, negative gage factor gages (coiled filament), gages containing powdered resistance elements, and gages having rolled foil filaments, among others. While the invention could be readily adapted to gages of the more conventional nature having lead wires extending from both ends rather than from one end only, it is felt that this would not be desirable from a practical point of view. It is also to be noted that semiconductor filaments can be employed for special applications, and that the structure of the invention is readily adaptable for use in essentially any energy-transfer device such as an immersion heater or as a transducer. In the latter application, the invention would find utility as a load ring, pressure pickup, and so forth, and would have the same advantages as the invention has in more conventional applications; namely, extremely good resistance to adverse environmental conditions.

While the foregoing description has employed the terms "lead wires" and "lead-out wires," it is to be understood that in the claims appended hereto the term "lead wires" embraces both of these terms. Similarly, it is to be understood that in the claims appended hereto the terms "environmental conditions" and "adverse environmental conditions" are intended to include any conditions that stainless steel of a nominal thickness will withstand over a reasonable period of time.

Having thus described the subject matter of my invention, what it is desired to secure by Letters Patent is:

1. In a strain gage, the combination of a generally tubular, metallic gage housing having an open end, a closed end and capable of being attached throughout its length by welding to a test specimen, a strain responsive elongated resistance element the resistance of which varies in accordance with the strains applied longitudinally thereto, a mass of compactable, solid electrical insulating material disposed in said housing, said housing exerting a compressive force on said insulating material and said resistance element whereby strains directed generally longitudinally of the housing as a result of dimensional changes of the test specimen to which the housing is attached are transmitted from said housing to said resistance element, lead wires integrally attached to said resistance element extending through the open end of said gage housing and connecting said element to an electrical resistance measuring circuit, and a generally tubular housing surrounding said lead wires and integrally attached to said gage housing.

2. In a strain gage, the combination of a generally tubular housing having a metallic gage section and a contiguous lead housing, said gage section terminating in a closed end and capable of being attached throughout its length by welding to a test specimen, a resistance element within said gage section the resistance of which varies in accordance with strains applied longitudinally thereto, a mass of compactable solid electrical insulating material disposed in said gage section, said gage section exerting a compressive force on said insulating material and said resistance element whereby strains directed longitudinally of the gage section as a result of dimensional changes of the test specimen to which the gage section is attached are transmitted from said gage section to said resistance element, and lead wires integrally attached to said resistance element and extending through said contiguous lead housing connecting said element to an electric resistance-measuring circuit.

3. The strain gage as claimed in claim 2, wherein said lead housing is metallic and has attached thereto over at least a portion of its length a metallic supporting flange, whereby said housing is capable of being attached to said test specimen by welding.

4. The strain gage as claimed in claim 2, wherein said tubular housing is hermetically sealed.

5. The strain gage as claimed in claim 2, wherein said lead housing and said lead wires form an integral coaxial unit.

6. The strain gage as claimed in claim 2, wherein said lead housing is, at least, in part, flexible.

7. The strain gage as claimed in claim 2, wherein said gage section and said lead housing are both metallic tubes, said lead housing tube having a sufficiently large inside diameter to fit around the end of said gage section and being integrally attached thereto.

8. In a weldable strain gage having lead wires extending therefrom, the improvements which comprise providing said gage with a sealed housing with said lead wires extending through one end thereof, said housing comprising a first sealed metallic tube section surrounding said gage and through which generally longitudinal strains are readily transmissible to said gage, and a second sealed metallic tube section integrally attached to said first section and surrounding said lead wires, said second tube section having a gas at positive pressure sealed therein, whereby said gage and said lead wires are effectively protected from environmental conditions.

9. In a strain gage, the combination of a generally tubular housing having a metallic gage section and a contiguous lead housing, said gage section terminating in a sealed end and capable of being attached throughout its length by welding to a test specimen, resistance means within said gage section the resistance of which varies at least in part in accordance with strains applied longitudinally thereto, a mass of compactable solid electrical insulating material disposed in said gage section, said housing exerting a compressive force on said insulating material and said resistance means whereby strains directed longitudinally of said housing as a result of dimensional changes of the test specimen to which the housing is attached are transmitted from said housing to said resistance element, and lead wires integrally attached to said resistance means and extending through said contiguous lead housing and connecting said resistance means to an electric resistance-measuring circuit.

10. In a weldable strain gage having a strain-responsive resistance element, a generally tubular, strain-deformable metallic housing surrounding said resistance element, compactable insulation between said resistance element and said housing, said insulation being held against said element by a compressive force exerted by said housing, and lead wires extending from said resistance element exterior of said housing and connecting said lead wires to an electric resistance-measuring circuit, the improvements which comprise providing said lead wires with a metallic housing integral with said tubular housing whereby said gage and said lead wires are protected from environmental conditions.

References Cited by the Examiner

UNITED STATES PATENTS

| | | | |
|---|---|---|---|
| 1,127,373 | 2/1915 | Read | 219—44 |
| 1,359,400 | 11/1920 | Lightfoot | 338—238 |
| 1,973,629 | 9/1934 | Hofer | 338—241 X |
| 2,046,102 | 6/1936 | Abbott | 338—241 X |
| 2,091,839 | 8/1937 | Tangeman | 338—241 X |
| 2,491,688 | 12/1949 | Pickels | 338—326 X |
| 2,508,512 | 5/1950 | Grinde | 338—241 X |
| 2,824,199 | 2/1958 | Browne | 338—241 |
| 2,935,709 | 5/1960 | Paine | 338—2 |

RICHARD M. WOOD, Primary Examiner.

W. D. BROOKS, H. T. POWELL, Assistant Examiners.